United States Patent [19]

Kawazoe

[11] 4,134,662
[45] Jan. 16, 1979

[54] COUPLING DEVICE IN A STROBOSCOPE HOLDER WITH A REMOVABLE BRACKET

[76] Inventor: Michio Kawazoe, 30-11 5 chome, Narita, Higashi, Suginami-ku, Tokyo, Japan

[21] Appl. No.: 824,349

[22] Filed: Aug. 15, 1977

[30] Foreign Application Priority Data

May 9, 1977 [JP] Japan .................. 52-058925[U]

[51] Int. Cl.² ................... G03B 17/00; A44B 19/00
[52] U.S. Cl. ....................... 354/293; 24/230 AL
[58] Field of Search ............... 354/126, 145, 293; 24/230 AL

[56] References Cited

U.S. PATENT DOCUMENTS 3,289,563  12/1966  Kent ................................. 354/293
3,999,055  12/1976  Wakahara et al. ............. 354/293 X Primary Examiner—Donald A. Griffin
Attorney, Agent, or Firm—Donald D. Mon

[57] ABSTRACT

A coupling device comprising a retainer including a spring-loaded joint bar with a U-shaped controlling member, and two insertions each of which includes an insertion body having a recess and a guide slope and one of which has a coupling bolt.

The stopper is attached to a stroboscope holder, while two insertions are attached to a bracket.

One of the two insertions with the coupling bolt is mounted on a bottom part of the bracket through the nut, with a bolt which is attached to the bracket.

The other of said two is mounted on a side part of the bracket.

An operator can, easily and quickly, attach a bracket to a stroboscope holder, or detach the former to the latter, and besides, by using selectively one of the two insertions according the situation of a camera, he can hold a camera together with a stroboscope, in the case of using a camera vertically as well as in the case of using a camera horizontally.

1 Claim, 4 Drawing Figures

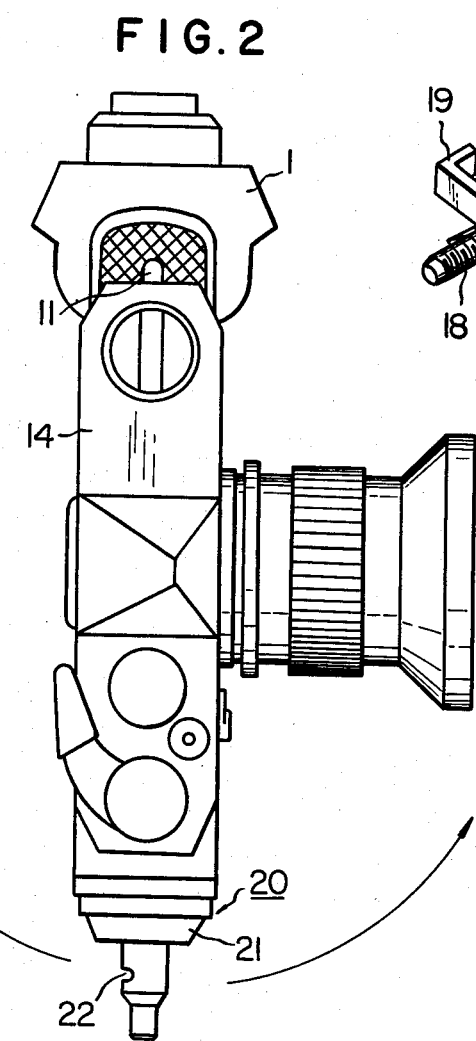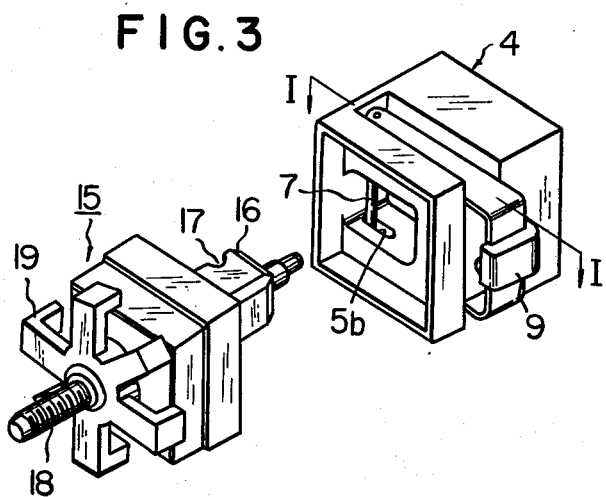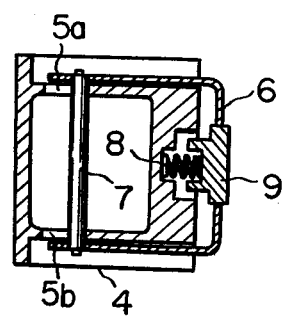

COUPLING DEVICE IN A STROBOSCOPE HOLDER WITH A REMOVABLE BRACKET

BACKGROUND OF THE INVENTION

This invention relates to a coupling device in a stroboscope holder with a removable bracket, and more particularly concerns a coupling device by which we can, easily and quickly, attach a bracket to a stroboscope holder and detach the former to the latter.

Conventionally, a stroboscope is fixedly attached with a bracket.

In general, when a photograph is taken with a stroboscope, a camera is mounted on a bracket, and a stroboscope is linked to a camera shutter. Then release of shutter synchronized with flashing, a photograph is taken.

In such a manner, when we take a photograph with holding a stroboscope together with a camera, a stroboscope holder with a bracket is very useful as a means of holding a camera together with a stroboscope.

But in case that a photograph is taken with a stroboscope being placed apart from a camera, a stroboscope holder fixed to a bracket is inconvenient.

Inventor of this invention previously proposed a coupling device by which we can, easily and quickly, attach to a stroboscope holder and detach therefrom.

This device comprises retainer including a spring-loaded joint bar, and an insertion including a solid body having a recess and a guide slope. The retainer is attached to a stroboscope holder, while the insertion is attached to a bracket. The insertion is easily and quickly connected with the retainer only by inserting the solid body into the retainer.

By a force which the joint bar receives from the solid body, the joint bar is slidden against a load of a spring along the guide slope until the joint bar falls in the recess, and the joint bar is engaged with the recess.

On the other hand, the insertion is removed easily and quickly from the retainer only by pushing the joint bar until the engagement of the joint bar with the recess is released, and then pulling out the solid body from the retainer.

As stated above, the above-mentioned device is a coupling device by which we can, easily and quickly, attach to a stroboscope holder and detach therefrom, and is best suited for using a camera in a horizontal position. But in the case of using a camera in a vertical position, it is difficult to hold a stroboscope holder, therefore the treatment of this device is difficult.

The present invention, therefore, contemplates the provision of an improved coupling device in a stroboscope holder with a bracket in which ease and speed of attachment of the bracket to a stroscope holder and detachment of the former from the latter is maintained, while a stroboscope is fixedly attached in the case of using a camera in a vertical position as well as in the case of using a camera in a horizontal position.

BRIEF SUMMARY OF THE INVENTION

It is an object of the invention to provide a coupling device in a stroboscope holder with a bracket whereby the bracket can be, easily and quickly, attached to a stroboscope holder and detached therefrom, in the case of using a camera vertically as well as in the case of using a camera horizontally.

These and other objects of the invention will become more apparent in the detailed description and example will follow.

BRIEF DESCRIPTION OF THE DRAWING

In the drawing:

FIG. 2 is left side elevation thereof;

FIG. 3 is a perspective view of parts of a coupling device according to the invention;

FIG. 4 is a cross section at I — I line in FIG. 4.

Figure 1:
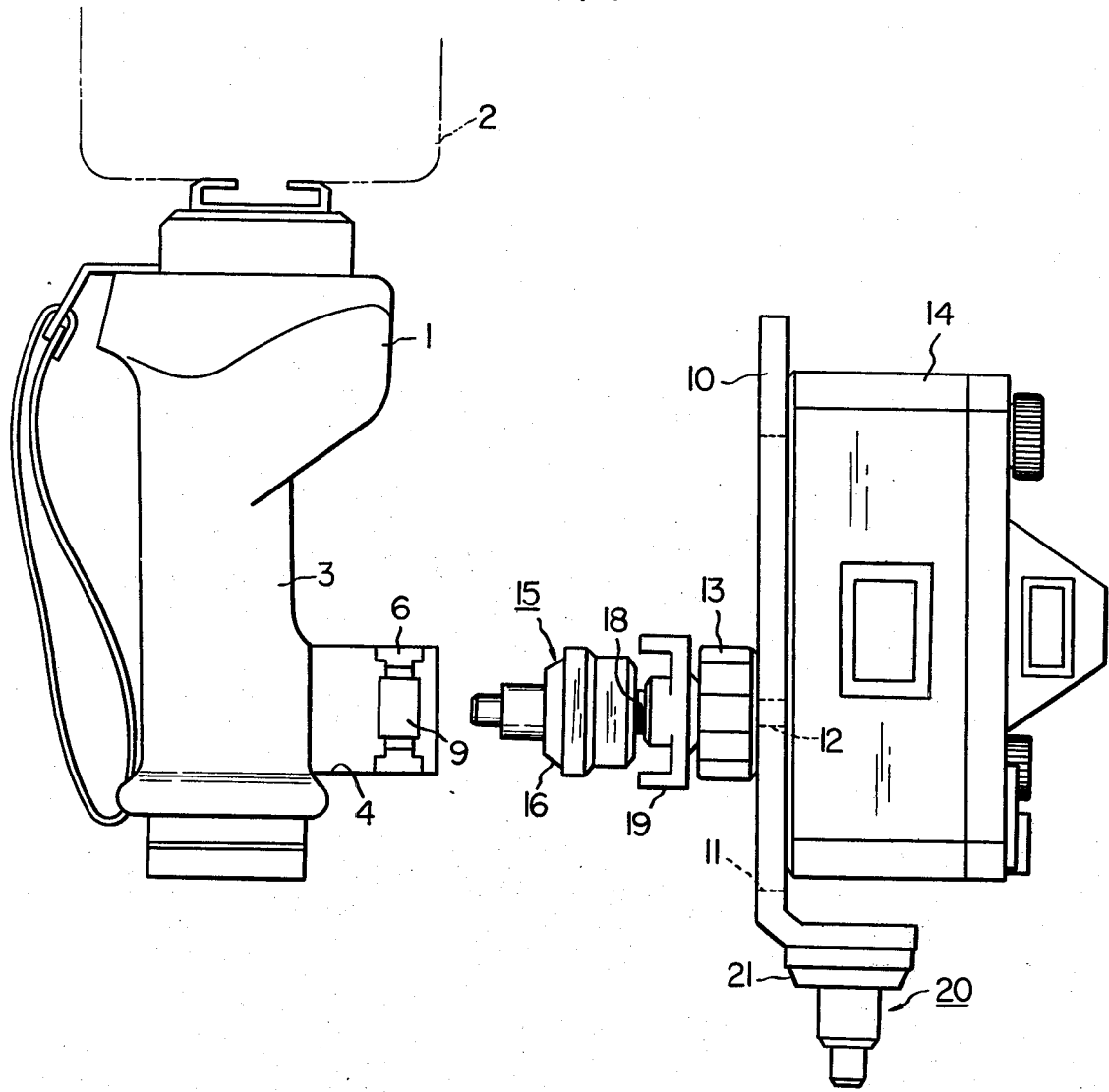
FIG. 1 is a perspective view of a coupling device according to the invention with a stroboscope, a stroboscope holder, and a bracket.

Referring first to the embodiment of the invention shown in FIGS. 1-4 inclusive device comprise a retainer 4 and two insertions 15 and 20.

The retainer 4 is attached to a handle 3 of a stroboscope holder 1 on which a stroboscope 2 is mounted, while the insertions 15 and 20 are attached to a bracket 10 for supporting a camera 14.

The retainer 4 has a pair of opposed slots 5a and 5b in a retainer body. One end of a joint bar 7 is inserted into the slot 5a, while another end of the joint bar 7 is inserted into the slot 5b, and the joint bar 7 engages with the slots 5a and 5b. A U-shaped controlling member 6 is attached to the ends of the joint bar 7. An outside of the U-shaped controlling member 6 protrudes out from the retainer body.

The joint bar 7 is controlled in a direction of the slots by a spring 8 which has one end fixed to the retainer body and another end fixed to a push plate 9 which is attached to the controlling member 6.

The bracket 10 has a slot 11 for setting a camera 14. A camera 14 is fixed to the bracket by means of a bolt 12 of a nut with bolt 13 for setting a camera.

The insertion 15 includes a guide slope 16, a recess 17, a coupling bolt 18, and a lock nut 19. The guide slope 16 is shaped so that the joint bar 7 can be conducted into the recess 17. The recess 17 engages with the joint bar 7. The joint bar 7 falls into the recess 12, whereby the insertion 15 is locked into the retainer 4. The coupling bolt 18 is engaged with the nut with a bolt 13, and tightened with the lock nut 19.

The insertion 20 is fixed to a side part of the bracket 10. The insertion 20 includes a guide slope 21, and a recess 22. The guide slope 21 is shaped so that the joint bar 7 can be conducted into the recess 22. The recess 22 engages with the joint bar 7. The joint bar 7 falls into the recess 22, whereby the insertion 20 is locked into the retainer 4.

By means of the coupling device according to the present invention, the bracket can be, easily and quickly, attached to the stroboscope holder, and removed therefrom, as follows.

When using a camera horizontally, in case of attaching the bracket 10 to the handle 3 of the stroboscope holder 1, the insertion 20 is inserted from an opening of the retainer 4 into the retainer 4 so as to load the joint bar 7. At time by a force which the joint bar 7 receives from the insertion, the joint bar 7 is slidden against a load of the spring 8 leftwards in FIG. 4 along the guide slope 21 until the joint bar 7 falls in the recess 22, and returned rightwards by the spring 8.

Further, when using a camera perpendicularly, in case of attaching the bracket 10 to the handle 3 of the stroboscope holder 1, the coupling bolt 18 is engaged with the nut with a bolt 13 as shown in FIG. 1, and tightened with the lock nut 19. In this case the coupling bolt 18 can be rotated 360 degrees when the lock nut 19 is loosened, and the relative position of the coupling bolt 18 and the nut with a bolt can be changed 360 degrees. Therefore, as the bracket 10 can be rotated 360 degrees in the direction of the arrow in FIG. 2, the direction of a camera 14 can be set arbitrarily.

Thereafter, if the insertion 15 is inserted from an opening of the retainer 4 into the retainer 4, the joint bar 7 will be slidden against a load of the spring 8 leftwards in FIG. 4 along the guide slope 16 in the same manner, until the joint bar 7 falls in the recess 17, and returned rightwards by the spring 8.

On the other hand, in case of removing the bracket 10 from the handle 3 of the stroboscope holder 1, a force is applied on the push plate 9, until the engagement of the joint bar with the recess 22 or the recess 17. After the engagement of the joint bar with the recess is released, the insertion can freely be pulled out from the retainer. And the insertion 15 can be detached from the nut with a bolt 13 by loosening the lock nut 19.

As stated above, according to this invention an operator can, easily and quickly, attach a bracket to a stroboscope holder, or detach the former to the latter, and besides he can handle, easily, a camera with a stroboscope, in the case of using a camera perpendicularly as well as in the case of using a camera horizontally.

What is claimed is:

1. In a stroboscope holder with a removable bracket wherein the bracket is attached to the stroboscope holder through a coupling device, said coupling device comprising:
   (a) a retainer mounted on the stroboscope holder including
      a pair of opposed slots made in a retainer body,
      a joint bar with one end inserted into one of the slots and with another end inserted into the other of that, which engages with the slots,
      a U-shaped controlling member attached to the two ends of the joint bar, an outside of said U-shaped controlling member protruding out from the retainer body,
      a push plate attached to the U-shaped controlling member, and
      a spring with one end fixed to the retainer body and with another end fixed to the push plate,
   (b) a nut with a bolt for setting a camera which is attached to a bottom part of the bracket,
   (c) a first insertion being mounted on a bottom part of the bracket through the nut with a bolt including
      a first insertion body with a recess which engages with the joint bar,
      a guide slope for leading said joint bar into said recess, said guide slope communicating with the recess, and a coupling bolt which is coupled to the nut with a bolt, and,
   (d) a second insertion being mounted on a side part of the bracket including a second insertion body with a recess which engages with the joint bar,
   a guide slope for leading said joint bar into said recess, said guide slope communicating with the recess, characterized in that an operator can, easily and quickly, attach a bracket to a stroboscope holder, or detach the former to the latter, and besides, by using selectively one of the two insertions according to the situation of a camera he can hold, easily a camera together with a stroboscope, in the case of using a camera vertically as well as in the case of using a camera horizontally.

* * * * *